United States Patent [19]

Helton

[11] Patent Number: 5,062,239

[45] Date of Patent: Nov. 5, 1991

[54] METHOD AND APPARATUS FOR WATERING POTTED PLANTS

[76] Inventor: Arch W. Helton, 6575 W. LoopSouth STE. 650, Bellaire, Tex. 77401

[21] Appl. No.: 484,782

[22] Filed: Feb. 26, 1990

[51] Int. Cl.$^5$ ............................................. A01G 25/00
[52] U.S. Cl. ......................................... 47/79; 47/67; 47/59
[58] Field of Search ...................... 47/48.5, 66, 67, 59, 47/72, 79

[56] References Cited

U.S. PATENT DOCUMENTS

| | | |
|---|---|---|
| 1,154,627 | 9/1915 | Hall ........................................ 47/79 X |
| 2,597,547 | 5/1952 | Tiberi ..................................... 47/79 X |
| 2,870,574 | 4/1956 | Sheridan . |
| 2,983,076 | 5/1961 | Merrill .................................... 47/79 X |
| 3,818,633 | 6/1974 | Sable . |
| 4,051,627 | 10/1977 | Schilling, Jr. ........................ 47/79 X |
| 4,121,608 | 10/1978 | MacLeod ............................. 47/79 X |
| 4,170,089 | 10/1979 | Smrt . |
| 4,175,354 | 11/1979 | Anderson ............................. 47/79 X |
| 4,229,904 | 10/1980 | Burton . |
| 4,447,983 | 5/1984 | Shimada ............................... 47/79 X |
| 4,619,072 | 10/1986 | Privett .................................. 47/79 X |
| 4,635,394 | 1/1987 | Brown . |
| 4,653,224 | 3/1987 | Weckesser ........................... 47/79 X |
| 4,744,171 | 5/1988 | Hilliard ................................. 47/67 |
| 4,882,875 | 11/1989 | Green ................................... 47/79 |

*Primary Examiner*—David A. Scherbel
*Assistant Examiner*—Linda T. Watson
*Attorney, Agent, or Firm*—James L. Jackson & Assoc.

[57] ABSTRACT

A method and apparatus for watering hanging or potted plants including suspension of a drippage collection receptacle from the container of the hanging plant which has an upwardly directed opening of larger dimension than the dimension of the container of the hanging plant. A liquid transfer tube extends from an outlet connector disposed at the lower portion of the receptacle and being of sufficient length such that its free end is positionable above the upper end of the receptacle and is capable of extending downwardly a predetermined distance below the receptacle. A tube retainer is provided at the upper end of the receptacle for releasably positioning the free end of the liquid transfer tube above the liquid level in the receptacle. The liquid transfer tube may also include a pump for transfer of liquid from the receptacle to the container of the hanging plant such as for recirculation of water and nutrients to the hanging plant. The apparatus may also provide for support of a potted plant within the receptacle and in elevated relation with the drain opening.

13 Claims, 1 Drawing Sheet

U.S. Patent　　　　　Nov. 5, 1991　　　　　5,062,239
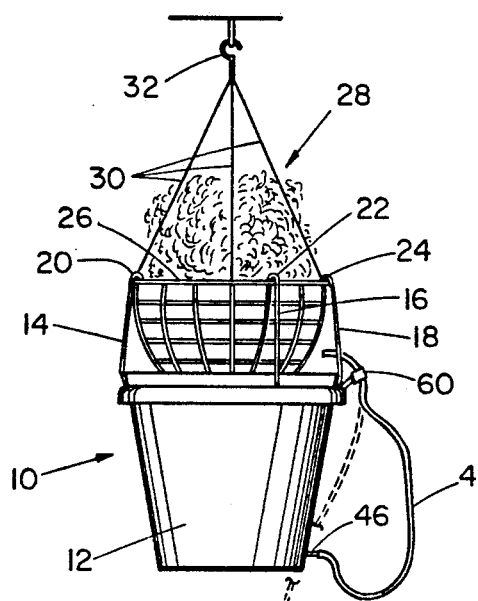
FIG. 1
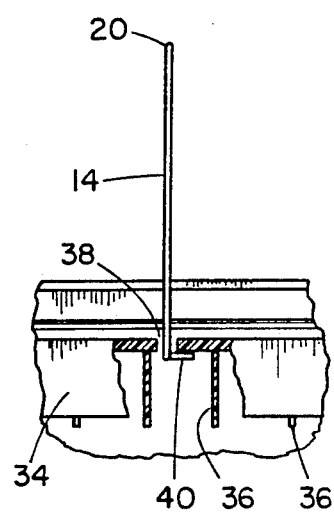
FIG. 2　　FIG. 3
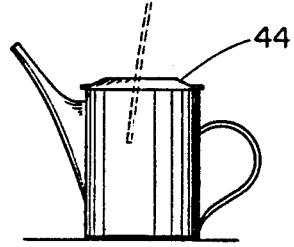
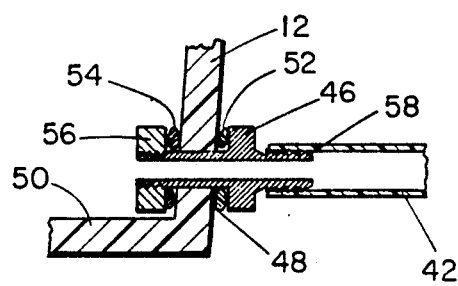
FIG. 4
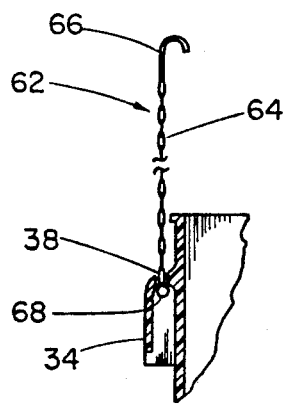
FIG. 5
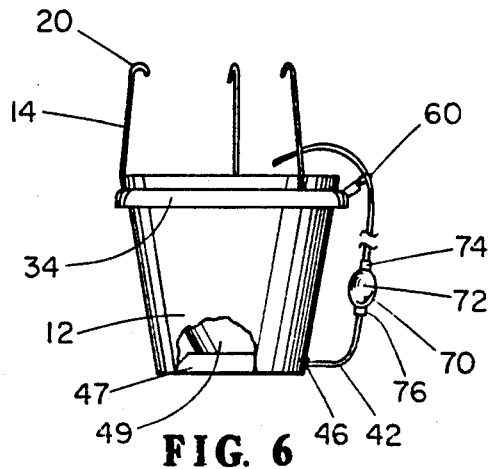
FIG. 6

METHOD AND APPARATUS FOR WATERING POTTED PLANTS

FIELD OF THE INVENTION

This invention relates generally to a method and apparatus for watering and fertilizing hanging plants and other potted plants, particularly those plants that are of tropical nature and are hung or placed indoors so as to place them at a convenient location for appreciation of the beauty thereof and for providing protection for such plants from the adverse conditions of the outdoor environment. More particularly, this application relates to a method and apparatus for in situ watering of hanging or other plants.

BACKGROUND OF THE INVENTION

Indoor plants have found wide appeal in homes, offices, and other locations. Continued maintenance of proper temperature and humidity for indoor growth of plants has been widely done for a number of years. These conditions facilitate continuous, year round growth of various types of tropical plants which flourish in the indoor environment when provided with adequate light, water and plant food. In many cases the plant food is mixed with water so that each time the plant is watered at regular intervals, it is also fed with an appropriate amount of plant food and appropriately treated with pesticide. Of late there has also developed an interest in providing potted plants of the hanging basket type which are intended to be hung indoors in offices, homes and in indoor gardens. Because hanging plants typically have small containers they must be watered fairly frequently. Further, many hanging plants of tropical origin require thorough watering on a frequent basis for simulation of tropical conditions.

Generally hanging baskets are provided in two basic types, i.e., wire baskets and closed pots. Wire hanging baskets are formed by a wire framework which is provided with a liner of spagnum moss, peat moss or any other suitable medium form lining the basket and providing a receptacle for soil that receives the roots of the plants. When wire basket type hanging plants are watered, the water poured onto the top of the soil typically seeps down through the soil into the spagnum moss. If excessive water is poured into the soil it can not be contained by the spagnum moss and will drip from the basket onto the floor. For this reason wire hanging baskets are not preferred for indoor use. Moreover, frequently, wire hanging baskets are watered by placing the basket into a large container of water and plant food, which is allowed to soak through the spagnum moss into the soil. When the basket is removed from the watering reservoir it must be hung outdoors for an extensive period of time sufficient for drainage to stop. Thereafter, it may be again hung indoors until such time as watering is again needed. The time and work required for tending this type of hanging plant can detract from the pleasure of hanging plants.

In the case of hanging plants with solid pots, typically pots having an imperforate wall of plastic are provided so that water poured onto the plant is securely retained. At the lower portion of many of these pots is also provided a shallow drip collector that is communicated by one or more drainage openings to the soil contained within the pot. For indoor watering, extreme care must be taken to insure that excessive water is not poured into the container; otherwise the drip collector of the pot will be unable to contain the water and it will drip onto the floor. These types of pots may also be placed in a reservoir of water for soaking as a means of watering, after which they must be hung outdoors until such time as drainage ceases.

The procedure for watering hanging baskets of the wire basket type and of the solid basket type is considered to constitute a significant nuisance as to detract from the pleasure of owning and maintaining plants of this nature. Further, since the watering and feeding procedure must be done outdoors or at a location where drippage is permitted, the hanging baskets must be frequently moved to and from the watering or soaking facility requiring considerable time and effort.

THE PRIOR ART

Various devices have been developed for in situ watering of hanging plants, such as the circular sheet of moisture impermeable flexible material disclosed by U.S. Pat. No. 3,818,633 of Sable. The prior art also includes an the elongated flexible container intended to be suspended from a hanging plant as taught by U.S. Pat. No. 4,229,904 of Burton. In the case of Burton, a solution of plant food and water is poured into a hanging plant and, after percolating through the soil and spagnum moss or peat moss of the hanging basket, drips from the plant into a suspended drippage collection receptacle. If a significant amount of water and plant food has dripped from the hanging plant into the drip collector, the container may be difficult to manage without spilling the water residue onto the floor. It is considered desirable, therefore to provide means for effectively removing collected water drippage from a drippage collection vessel, to insure that the vessel remains of light weight and to permit ease of handling the drip collection vessel. It is also desirable to provide a plant watering system for hanging plants that effectively permits recirculation of water and plant food to hanging plants without necessitating their removal from the indoor environment.

SUMMARY OF THE INVENTION

It is a principal feature of this invention to provide a novel method and apparatus for watering hanging plants which includes provision of a receptacle or reservoir adapted for suspension from the container of a hanging plant, which receptacle efficiently catches any drippage that occurs during watering and feeding of the plant and thus permits indoor watering of hanging plants.

It is also a feature of this invention to provide a novel method and apparatus for watering hanging plants wherein the receptacle for collecting drippage is of sufficient dimension to as to enable water induced leaching of harmful constituents from the plant soil to promote the continued health of such plants.

It is an even further feature of this invention to provide a novel method and apparatus for watering hanging plants wherein a leakage collection receptacle defined by the invention is provided with a controllable drain to permit removal of collected water from the receptacle while it remains suspended from a hanging plant and to permit reuse of the collected water for plant watering.

It is an even further feature of this invention to provide a novel method and apparatus for watering hanging plants wherein a drippage collection receptacle may be provided with a water pump mechanism enabling selective recirculation of water and plant food to a hanging plant to insure its thorough watering.

It is another feature of this invention, as applicable to hanging plants, to provide a novel method and apparatus for watering hanging plants which permits in situ watering and feeding of the plants without removing them from their respective indoor hanging positions and preventing drippage of water and plant food onto the floor beneath the plant.

The various features and objects of this invention are attained through the provision of a drippage collection receptacle which is provided with a plurality of suspension elements or hangers, enabling the receptacle to be suspended below and in centrally oriented relation from the container of a hanging plant. The receptacle defines an opening of sufficient dimension that any drippage from the hanging plant will enter the drippage collection receptacle. The drippage collection receptacle is provided with an outlet fitting and a drain tube extending from the outlet fitting at the lower portion of the receptacle and enabling the majority of the collected liquid contained therein to be drained into an appropriate receptacle for disposal or for reuse. The receptacle is also provided with a drain tube retainer at its upper portion, which retainer secures the free end of the drain tube at a location above the receptacle and thus prevents drainage from the receptacle until such is desired.

For continuous circulation of water and plant food from the drainage collection receptacle into the hanging plant a tubular conduit extending from the lower portion of the drainage collection receptacle may be provided with a pump such as a manually operated squeeze pump to thus enable water and plant food solution to be manually pumped from the receptacle into the hanging plant to facilitate thorough and efficient watering and feeding of the plant.

In the case of potted plants for typical indoor location, it is desirable to provide a system for indoor application of water, fertilizer, pesticide, etc. Especially in the case of pesticide, it is important to insure that a person's skin does not come into contact with the water/fertilizer/pesticide mixture since prolonged contact with pesticide can adversely effect the health of the user.

As shown in FIG. 6, the receptacle 12 is shown to have a plant support therein which can be in the form Of a separate plant support element or a specifically designed bottom wall of the receptacle. The pot of a potted plant is shown to be located within the receptacle and supported by the support element with the lower end of the pot elevated above the level of the outlet opening. Sufficient water/fertilizer/pesticide mixture is then placed inside the receptacle such that the plant within the pot is permitted to become soaked. Thereafter, the mixture is drained from the receptacle into a suitable container. After sufficient excess mixture has drained from the potted plant that drainage ceases, the potted plant may then be removed from the receptacle and returned to its usual location.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is an elevational view of apparatus for watering hanging plants which, is constructed in accordance with the teachings of the present invention.

FIG. 2 is a fragmentary sectional view of the apparatus of FIG. 1, illustrating the upper portion of the drippage collection receptacle and the relationship of one of the receptacle hanger elements thereto.

FIG. 3 is a partial elevational view of the apparatus of FIG. 1 with parts thereof broken away and shown in section and further illustrating the detailed construction of the drippage collection receptacle and one of the hanger elements thereof.

FIG. 4 is a fragmentary sectional view of the bottom portion of the drippage collection receptacle of FIG. 1, illustrating the connection of the flexible drainage conduit thereto.

FIG. 5 is a fragmentary sectional view illustrating an alternative embodiment of this invention wherein the hanger elements of the drippage collection assembly are defined by bead chains having hooks at the upper ends thereof.

FIG. 6 is a fragmentary sectional view of a further alternative embodiment of this invention for watering hanging plants and potted plants and wherein the drain tube of the drippage collection receptacle is provided with a hand pump enabling pumped delivery of liquid from the receptacle to the hanging plant or to a suitable container.

DETAILED DESCRIPTION OF PREFERRED EMBODIMENT

Referring now to the drawings and first to FIG. 1, apparatus for watering hanging plants may conveniently take the form shown generally at 10 wherein a drippage collection receptacle 12 is shown to be provided with a plurality of hanger elements 14, 16 and 18 having hook elements 20, 22 and 24 respectively at the upper ends thereof disposed for appropriate engagement with the basket-type container portion 26 of a hanging plant shown generally at 28. The hanging plant is shown to be of the wire basket type having a wire basket framework within which is normally disposed a lining of spagnum moss or peat moss forming a receptacle into which is placed the soil into which the roots of the plant are located. The hanging basket is suspended by a plurality of bridle elements 30 in the form of wires, strings, etc. having a hook element 32 at the upper end thereof which is intended to be disposed in supporting engagement with any suitable type of support. When thoroughly watered some of the liquid mixture poured into the hanging basket will typically drip or leak from the lower portion of the hanging basket.

As shown in the sectional view of FIGS. 2 and 3, the drippage collection receptacle 12 defines an integral outwardly and downwardly projecting circular flange 34 which is interconnected with the wall structure of the receptacle by means of a number of web connector elements 36 which are also formed integrally with the receptacle structure. Openings 38 are formed in the upper portion of the flange 34 at the juncture of the flange with the sidewall structure of the receptacle 12.

The hanger elements 14, 16 and 18 are shown in FIGS. 2 and 3 as being formed of wire which is bent at the lower portion thereof to define a laterally extending orienting portion 40 which is offset 90° in relation to the orientation of the hook 20. Thus, when the orienting portion is positioned as shown in FIGS. 2 and 3, it is restrained by the wall of the receptacle and by the flange 34 and thus orients the upper hook portion 20 to project inwardly to facilitate hooking engagement with the upper portion of the basket 26 of the hanging plant. Where the container of the hanging plant is a rather imperforate molded pot structure rather than the open wire framework structure shown in FIG. 1, the hooks 20, 22 and 24 will simply hook over the upper rim of the plant container to provide adequate support for the drippage collection receptacle 12.

To insure that the drippage collection receptacle does not become sufficiently heavy with collected water as to impede its ease of handling, the drippage collection receptacle is provided with liquid drain means which conveniently takes the form of a tubular drain tube 42 which extends from the lower portion of the drippage collection receptacle and as shown in FIG. 1 is of sufficient length to enable draining of water from the receptacle 12 into a suitable container 44 as shown in broken lines. Connection of the drain tube 42 to the receptacle 12 is illustrated in FIG. 4 where a drain outlet fitting 46 is shown to extend through an opening 48 formed in the wall of the receptacle 12 near the bottom wall 50 of the receptacle.

The drain fitting 46 is sealed with respect to the wall structure of the receptacle 12 by means of O-rings 52 and 54 and is secured in place within the drain aperture 48 by means of a retainer nut 56 which is threadedly received by the inner extremity of the drain fitting. The outer portion of the drain fitting forms a tubular projection 58 which is provided with a plurality of external circular ribs that serve to retain the drain tube 42 when it is forced onto the drain projection 58. Although a specific structure is set forth to provide for drainage of liquid from the drippage collection receptacle 12, it is not intended that the present invention be limited to this specific structure. It is considered within the scope of this invention that drain systems of any other suitable form may be provided to insure controlled drainage of liquid from the receptacle 12 for the purpose of insuring that the receptacle 12 does not become excessively heavy with accumulated water to the point that it becomes difficult to handle.

While the drippage collection receptacle 12 is in place on the container of the hanging plant 28, as shown in FIG. 1 for the purpose of collecting water that drains or drips from the hanging plant, it will be desirable to maintain the free end portion of the drain tube 42 in elevated position above the upper end of the receptacle. This feature is accomplished through the provision of a tube retainer element 60 which is secured to the upper end of the receptacle 12 and defines a retainer aperture of appropriate configuration for suitably securing the drain tube in the position shown in full line in FIG. 1. It has been found that adequate support for the tube 42 will be provided by a tube retainer composed of rather stiff wire which is bent to form a circular loop that is slightly larger than the outer diameter of the drain tube 42. The wire loop is oriented so that the free end of the drain tube is releasably secured in place. Obviously, other tube retaining devices may be provided within the spirit and scope of the present invention.

FIG. 5 is a fragmentary sectional view of an upper portion of apparatus for watering hanging plants which represents an alternative embodiment of this invention incorporating a plurality of hanger elements shown generally at 62 which incorporate bead chains 64 of suitable length having rigid hook elements 66 disposed at the upper end thereof and adapted for retaining engagement with the upper portion of a hanging basket or hanging pot for plants. The lower portion of the bead chain 64 extends through the opening 38 in the upper portion of circular flange 34 in the same manner as the wire hangers described above and is provided with a lower retainer element 68 that is sufficiently large so as to prevent its passage through the opening 38, thus permitting the bead chain to establish support engagement with the flange 34. The leakage collection receptacle 12 will therefore be supported by a plurality of hanger elements such as those shown at 62. Hanger elements of this type will be sufficiently flexible to permit the hangers to be extended around objects for efficient supporting engagement with the hanging basket or hanging pot from which the receptacle is suspended.

Referring now to FIG. 6, a further alternative embodiment of this invention is disclosed which is of the same general construction as shown in FIG. 1 but which incorporates an energized liquid pump so that liquid may be pumped from the reservoir of the receptacle 12 upwardly into the hanging plant as desired for thorough watering. In FIG. 6, like structures in comparison with FIG. 1 are shown by like reference characters. Within the drain tube 42 is coupled a manually energized pump incorporating a flexible deformable bulb 70 forming a variable volume pumping chamber 72. The pumping chamber is in communication with the flow passage of the drain tube 42 by means of a pair of check valves 74 and 76 which define drain tube connections. The free end of the drain tube may be positioned so that water and plant food ejected therefrom by manual manipulation of the hand pump will flow into the hanging plant from which the receptacle 12 is suspended. With the drain tube so positioned, the flexible bulb 70 of the pump mechanism is repeatedly manually squeezed to force water and plant food from the pump chamber upwardly through the drain tube 42 into the hanging plant. As the pump bulb 70, which may be formed of rubber or any suitable resilient material, returns to its undeformed configuration, the pump chamber 72 becomes enlarged and develops a suction moving water and plant food solution from the lower portion of the drain tube past the check valve 76 into the pump chamber. As the bulb 70 is squeezed, the volume of the chamber 72 is reduced, thus forcing liquid therein past the check valve 74 upwardly through the drain tube 42 to the hanging plant. This unidirectional pumping action may be continued for a sufficient period of time to insure that the soil within the hanging plant becomes thoroughly moistened. Any residue of water draining from the hanging plant will then be caught by the drippage collection receptacle so that it may be reused or disposed of as is deemed appropriate. Although a manually energized pump is discussed herein, it should be borne in mind that a small motor energized pump may also be employed for water circulation.

As shown by the cut away portion of FIG. 6, the drippage collection receptacle 12 may be effectively utilized for application of water, fertilizer and pesticide to conventional potted plants as well as hanging plants. In the case of potted plants, thorough watering may be done by placing the container of the potted plant into a body of the liquid mixture and allowing the potted plant to remain for a sufficient time that it becomes thoroughly soaked. Thereafter, the potted plant must then be drained of excessive liquid until dripping ceases.

According to the present invention, a plant support insert 47 may be placed within the receptacle 12 in the manner shown in FIG. 6 to provide a support for a potted plant 49. The purpose of the insert 47 is to position the container of the potted plant at a position which is in elevated relation with the liquid drain outlet 46 fitting. The plant watering apparatus of FIG. 6 is then utilized as follows: With the drain tube 60 elevated in the manner shown in FIG. 6 and with the plant 49 supported by the plant support insert 47, a quantity of an appropriate liquid mixture such as water, fertilizer, pesticide, etc. is placed within the receptacle 12 to a level that will allow the soil of the potted plant to become thoroughly soaked. To enhance soaking of the potted plant, the manually actuated pump 72 will be utilized to pump water from the drippage collection receptacle to the upper portion of the plant. Typically this is not necessary since thorough soaking of the plant will occur when placed within the liquid mixture. It should also be born in mind that the pump 72 will permit drainage to occur through the drain tube 60 when the tube is lowered to its drain position as shown in broken lines in FIG. 1. Alternatively, or additionally a drain tube such as shown in 42 in FIG. 1 may be employed to ensure the capability of draining liquid from the receptacle 12.

For liquid drainage, the drain tube 60 is lowered and liquid is permitted to drain into an appropriate receptacle such as shown at 44 in FIG. 1. The drain tube 60 then may be repositioned as shown in FIG. 6 and the plant 49 will be permitted to remain supported within the receptacle 12 so that excess water will be allowed to drip from it into the lower portion of the receptacle. After draining of the potted plant 49 has been completed, the potted plant may be removed from the receptacle 12 and returned to its normal location.

Although the potted plant 49 is shown to be elevated by a plant support insert 47, it should be born in mind that the lower wall of the receptacle 12 may be formed with an internally upstanding portion of similar configuration to that shown at 47. In fact, any suitable character of plant support may be employed to locate the lower portion of the plant container above the level of the water drain outlet fitting of the receptacle 12.

In view of the foregoing, it is evident that the present invention is one well adapted to attain all of the objects and features hereinabove set forth, together with other objects and features which are inherent in the apparatus disclosed herein.

As will be readily apparent to those skilled in the art, the present invention may be produced in other specific forms without departing from its spirit or essential characteristics. The present embodiment, is therefore, to be considered as illustrative and not restrictive, the scope of the invention being indicated by the claims rather than the foregoing description, and all changes which come within the meaning and range of the equivalence of the claims are therefore intended to be embraced therein.

What is claimed is:

1. Apparatus for watering a hanging plant having a container with soil therein for growing plants and a bridle for suspension thereof, comprising:

(a) a receptacle having bottom and side wall means and forming an upwardly directed opening having sufficient dimension for collection of any water dripped from said hanging plant, said side wall means having a drain opening near said bottom wall;
    (b) a plurality of hanger elements disposed for suspension of said receptacle, said hanger elements being adapted for releasable engagement with said container of said hanging plant;
    (c) a water drain fitting being provided in said drain opening means and forming an outlet at the lower portion of said receptacle; and
    (d) a flexible liquid drain tube extending from said and being of sufficient length to extend above said receptacle and to extend a predetermined distance below said receptacle, said flexible liquid drain tube forming an open free end.

2. The apparatus of claim 1, including:
means for securing said free end of said liquid drain tube to said receptacle so that said free end of said liquid drain tube is located above said receptacle.

3. The apparatus of claim 2, wherein:
said means for securing said liquid drain tube to said receptacle comprises a tube retainer tube loop for releasably securing said tube with said free end thereof in elevated position above said receptacle.

4. The apparatus of claim 1, wherein:

(a) said receptacle defines a downwardly extending external flange formed integrally therewith and having a portion thereof disposed in spaced relation with said side wall means of said receptacle, said external flange forming a plurality of hanger apertures;
    (b) said hanger means being defined by a plurality of hanger elements extending upwardly through said hanger apertures in said external flange, said hanger wires forming laterally extending hooks for retaining engagement with said container of said hanging plant and forming hook orienting means for positioning of said hooks in oriented relation for said retaining engagement with said container of said hanging plant.

5. The apparatus of claim 4, wherein said laterally extending hook orienting means for each of said hanger elements comprise:
a laterally extending integral hook orienting element projecting from the lower end of said hanger wire and being disposed in substantially 90° offset relation with said hook, said hook orienting element being restrained in proper oriented position by said wall means of said receptacle and by said external flange of said receptacle and thus establishing retaining orientation of said hook.

6. The apparatus of claim 5 including:
tube retainer means being supported by said receptacle and being disposed for releasably securing said free end of said liquid transfer tube in elevated position relative to said receptacle.

7. The apparatus of claim 1, including:
liquid pump means in said flexible liquid transfer tube enabling pumped delivery of liquid from said receptacle to said container of said hanging plant.

8. The apparatus of claim 7, wherein:

(a) said pump means is defined by a manually deformable pump bulb forming a variable volume chamber and having tube connections at opposed ends thereof; and (b) a pair of check valves being disposed at respective tube connections of said deformable pump bulb for establishment of unidirectional pumped transfer of liquid from said liquid drain tube to said hanging plant.

9. The apparatus of claim 1, wherein:

said plurality of hanger elements are defined by bead chains extending from said receptacle and forming free ends and having suspension hooks disposed at the respective free ends thereof.

10. Apparatus for watering potted plants having a container with soil therein for growing plants, said receptacle forming said and bottom wall means and defining an upwardly directed opening adapted to receive a hanging plant therethrough, comprising:

(a) a receptacle of sufficient dimension for receiving the container of a potted plant therein;

(b) drain means being located in said wall means of said receptacle;

(c) a plant support being located within said receptacle for supporting the container of the potted plant in elevated relation with said outlet means; and (d) a flexible liquid drain tube extending from said outlet means and being of sufficient length to extend above said receptacle and to extend a predetermined distance below said receptacle, said flexible liquid drain tube forming an open free end.

11. The apparatus of claim 10, including:

means for securing said free end of said liquid drain tube to said receptacle so that said free end of said liquid drain tube is located above said receptacle.

12. The apparatus of claim 10, including:

liquid pump means in said flexible drain tube enabling pumped delivery of liquid from said receptacle to said container of said potted plant.

13. The apparatus of claim 12, wherein:

(a) said pump means is defined by a manually deformable pump bulb forming a variable volume chamber and having tube connections at opposed ends thereof; and (b) a pair of check valves being disposed at respective tube connections of said deformable pump bulb for establishment of unidirectional pumped transfer of liquid from said liquid drain tube to said container of said potted plant.

* * * * *